United States Patent
Sun et al.

(10) Patent No.: US 12,108,230 B2
(45) Date of Patent: Oct. 1, 2024

(54) MEDIA PLAYING DEVICE AND SELF-SERVICE TERMINAL

(71) Applicant: Elo Touch Solutions, Inc., Milpitas, CA (US)

(72) Inventors: Yin Sun, Shanghai (CN); Haolai Zhou, Shanghai (CN); Jinfeng Zhang, Shanghai (CN)

(73) Assignee: Elo Touch Solutions, Inc., Knoxville, TN (US)

( * ) Notice: Subject to any disclaimer, the term of this patent is extended or adjusted under 35 U.S.C. 154(b) by 128 days.

(21) Appl. No.: 17/734,676

(22) Filed: May 2, 2022

(65) Prior Publication Data
US 2022/0360837 A1    Nov. 10, 2022

(30) Foreign Application Priority Data

May 8, 2021    (CN) .......................... 202110497658.8

(51) Int. Cl.
*H04R 5/02* (2006.01)
(52) U.S. Cl.
CPC ..................................... *H04R 5/02* (2013.01)
(58) Field of Classification Search
CPC ....................................................... H04R 5/02
See application file for complete search history.

(56) References Cited

U.S. PATENT DOCUMENTS

| | | | |
|---|---|---|---|
| 5,235,509 A | 8/1993 | Mueller et al. | |
| 5,758,322 A | 5/1998 | Rongley | |
| 5,845,263 A | 12/1998 | Camaisa et al. | |
| 5,907,275 A | 5/1999 | Battistini et al. | |
| 6,853,972 B2 | 2/2005 | Friedrich et al. | |
| 9,966,079 B2 | 5/2018 | VanBlon et al. | |
| 2002/0007315 A1 | 1/2002 | Rose | |
| 2002/0038259 A1 | 3/2002 | Bergman et al. | |
| 2002/0138350 A1 | 9/2002 | Cogen | |
| 2003/0078793 A1 | 4/2003 | Toth | |
| 2005/0049921 A1 | 3/2005 | Tengler et al. | |
| 2019/0141445 A1* | 5/2019 | Wu | G10L 21/0208 |
| 2021/0314521 A1* | 10/2021 | Olshansky | G06V 20/46 |

FOREIGN PATENT DOCUMENTS

| | | |
|---|---|---|
| JP | 6664455 B1 * | 3/2020 |
| WO | WO 01/97206 A1 | 12/2001 |

OTHER PUBLICATIONS

Translation of JP6664455 Kawabata Mar. 13, 20 (Year: 2020).*

* cited by examiner

*Primary Examiner* — Andrew Sniezek
(74) *Attorney, Agent, or Firm* — Sterne, Kessler, Goldstein & Fox P.L.L.C.

(57) ABSTRACT

The present disclosure relates to a media playing device. A media playing device according to an embodiment of the present disclosure includes: a body, a speaker, and a controller. The controller is configured to, in response to a user staying at a specific position relative to the body, control the speaker to face the user's head and to play sounds. The present disclosure further relates to a self-service terminal.

20 Claims, 8 Drawing Sheets

MEDIA PLAYING DEVICE AND SELF-SERVICE TERMINAL

CROSS REFERENCE

This application claims priority to CN Application No. 202110497658.8, filed May 8, 2021, which is hereby incorporated by reference in its entirety.

TECHNICAL FIELD

The present disclosure relates to media playing devices and self-service terminals.

BACKGROUND ART

A media playing device may be used to play media such as a screen (for example, video) and/or sounds (for example, audio), and may be used as an advertisement player, for example. The advertisement player may be placed in places such as elevator halls, carriages of elevators, carriages of vehicles, stations, roadsides, and show windows.

CONTENT OF THE DISCLOSURE

One of objectives of the present disclosure is to provide a media playing device and a self-service terminal.

According to a first aspect of the present disclosure, there is provided a media playing device. The media playing device includes: a body; a speaker; and a controller configured to control the speaker to face the head of a user and control the speaker to play a sound in response to the user staying at a specific position relative to the body.

According to a second aspect of the present disclosure, there is provided a media playing device. The media playing device includes: a display; a speaker; and a controller configured to: control the display to display a screen; in response to a user staying at a specific position relative to the display, control the speaker to face the head of the user; and in response to the speaker facing the head of the user, control the speaker to play a sound associated with a screen being displayed on the display.

According to a third aspect of the present disclosure, there is provided a self-service terminal. The self-service terminal includes: a display configured to display a screen; a microphone; a camera provided at a specific position relative to the microphone; and a controller, configured to: in response to a user staying at a specific position relative to the display, adjust an orientation of the microphone according to an image captured by the camera, so as to control the microphone to face the head of the user.

By the following detailed description of exemplary embodiments of the present disclosure with reference to accompanying drawings, other features and advantages of the present disclosure will become clear.

BRIEF DESCRIPTION OF THE DRAWINGS

Accompanying drawings constituting a part of the specification describe embodiments of the present disclosure, and together with the specification, serve to explain the principle of the present disclosure.

With reference to the accompanying drawings, the present disclosure may be understood more clearly according to the following detailed description, in which.

Figure 1:
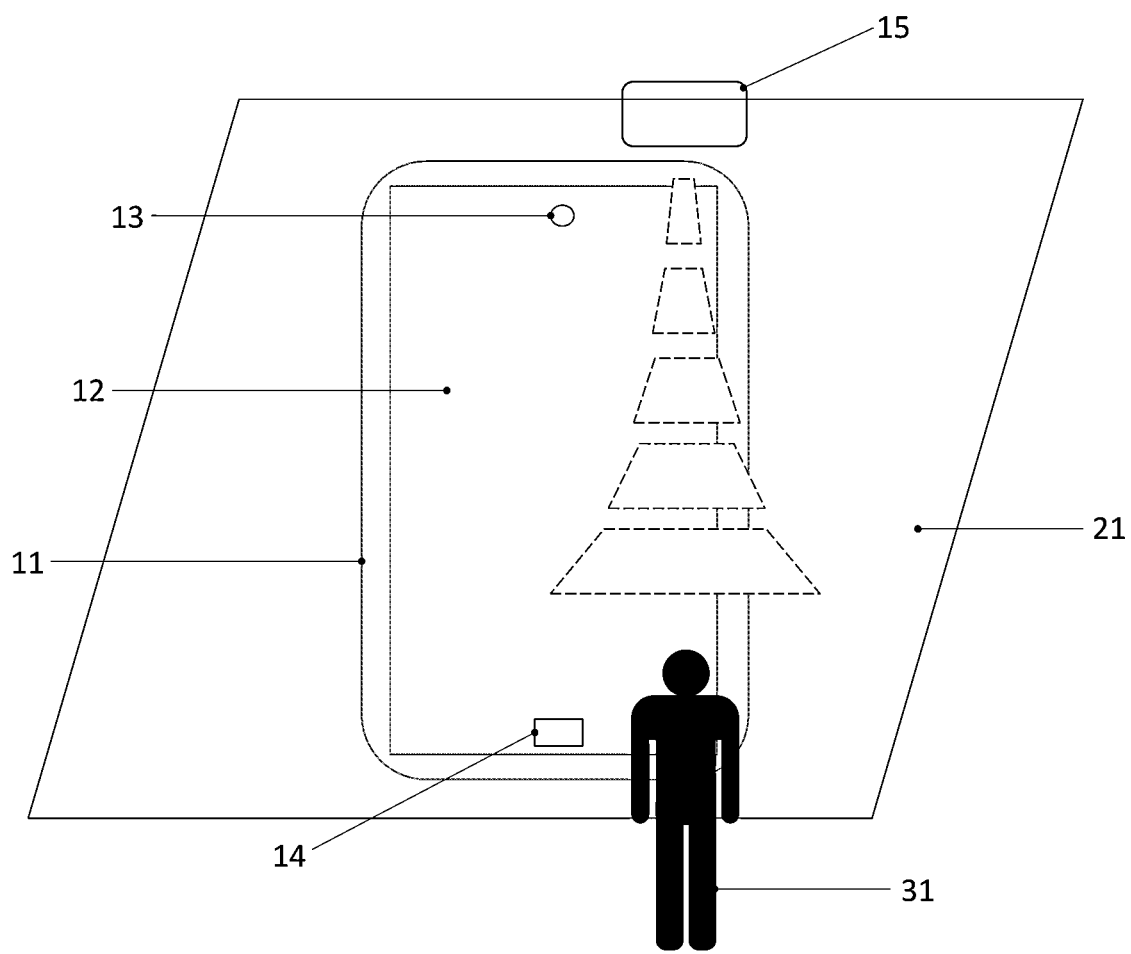
FIG. 1 is a schematic diagram of an operating state of a media playing device according to an embodiment of the present disclosure.

It should be noted that, in embodiments described below, the same reference numerals are sometimes used in common between different drawings to denote same parts or parts with the same functions, and repeated descriptions thereof are omitted. In some cases, similar reference numerals and letters are used to indicate similar items. Therefore, once an item is defined in one drawing, it does not need to be further discussed in subsequent drawings.

EMBODIMENTS

Embodiments of the present disclosure will be described below with reference to the drawings, in which several embodiments of the present disclosure are shown. It should be understood, however, that the present disclosure may be implemented in many different ways, and is not limited to the example embodiments described below. In fact, the embodiments described hereinafter are intended to make the present disclosure to be more complete and to adequately explain the scope of the present disclosure to a person skilled in the art. It should also be understood that, the embodiments disclosed herein can be combined in various ways to provide many additional embodiments.

It should be understood that, the wording in the present disclosure is only used for describing particular embodiments and is not intended to limit the present disclosure. All the terms used in the specification (including technical and scientific terms) have the meanings as normally understood by a person skilled in the art, unless otherwise defined. For the sake of conciseness and/or clarity, well-known functions or constructions may not be described in detail.

The term "A or B" used through the present disclosure refers to "A and B" and "A or B" rather than meaning that A and B are exclusive, unless otherwise specified.

The term "exemplary", as used herein, means "serving as an example, instance, or illustration", instead of a "model" to be exactly duplicated. Any implementation described herein as exemplary is not necessarily to be construed as preferred or advantageous over other implementations. Furthermore, there is no intention for the present disclosure to be bound by any expressed or implied theory presented in the part of technical field, the background art, the content of the disclosure or the embodiments.

Herein, certain terminology, such as the terms "first", "second" and the like, may also be used in the following specification for the purpose of reference only, and thus are not intended to limit. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, unity, steps, operations, elements, and/or components, but do not preclude the presence or addition of one or more other features, unities, steps, operations, elements and/or components, and/or groups thereof.

FIG. 1 is a schematic diagram of an operating state of a media playing device according to an embodiment of the present disclosure. In this embodiment, the media playing device includes a body 11, a display 12, a camera 13, a sensor 14, and a speaker 15. The display 12, the camera 13 and the sensor 14 are mounted on the body 11. Although not shown in the figure, it should be noted that the body 11 may be arranged with one or more controllers therein. Functions of the controller may be implemented by one or more processors executing a series of executable instructions stored in one or more memories. In some embodiments, functions of the controller may be as described below.

If the body 11 of the media playing device is placed in an open-air environment without a cover, electronic components such as the display 12, the camera 13, the sensor 14, and the controller installed in the body 11 may be damaged by rains, sun lights, etc. Therefore, the body 11 of the media playing device is preferred to be placed in an indoor environment. The "indoor" environment herein refers to an environment where the body 11 is protected by a cover to reduce the influence from the outside on the body 11 and components installed in the body 11. The indoor environment includes but not limited to buildings such as houses, transportations, facilities such as rain shelters/sunshades, light boxes, shop windows, etc. In some cases where the body 11 is placed in a relatively closed indoor environment, such as in a light box or in a shop window, if the speaker 15 is also placed in the indoor environment together with the body 11, it may be impossible for a person outside to hear or capture sounds played by the speaker 15. A possible solution to these cases is to install the speaker 15 and the body 11 (with the display 12, etc.) separately from each other. In embodiments shown in FIG. 1 to FIG. 4, the body 11 is installed on the inside of a transparent partition 21 (such as a panel of a light box, glass of a shop window, etc.) while facing outwardly, and the speaker 15 is installed on the outside of the transparent partition 21. In this way, the body 11 and components provided in the body 11 may be protected from external influences, and experience of a person 31 outside the transparent partition 21 to sounds played by the speaker 15 may be improved.

The controller of the media playing device may control the display 12 to display a screen, such as text, pictures, video or combinations thereof. The sensor 14 may be, for example, a distance sensor (including one or more selected from an optical distance sensor, an infrared distance sensor, and an ultrasonic distance sensor), which may be used to detect whether a person 31 stays at a specific position with respect to the body 11, for example, whether the person 31 stays at a position directly in front of the display 12 and/or obliquely in front of the display 12. The term "stay" herein includes that a moving speed of the person is less than a preset speed threshold (indicating that the person stops or walks slowly) and staying duration of the person at a specific location is greater than a preset duration threshold (for example, staying duration of the person at a position directly in front of the display 12 and/or obliquely in front of the display 12 is greater than 2 seconds). It should be noted that in other embodiments, other means may be used to detect whether the person 31 stays at a specific position with respect to the body 11. For example, it may be detected based on an image captured by the camera 13 by using computer vision technology. If it is detected that the person 31 stays at a specific position relative to the body 11, it means that the person 31 (the person 31 is also referred to as a "user" 31 herein) may be interested in contents displayed on the display 12. Then the controller may control the speaker 15 to turn to face the head of the user 31 (in some embodiments, more precisely, the speaker 15 may be controlled exactly to face an ear of the user 31), and control the speaker 15 to play sounds associated with a screen being displayed on the display 12. The media playing device according to this embodiment enables the speaker 15 to play sounds while facing the head (or ear) of the user 31, which may improve the user 31's experience to the played sounds. In addition, since the speaker 15 plays sounds while facing the head (or ear) of the user 31, even if the sounds is played in a lower volume, it may be ensured that the user 31 can clearly hear the content being played, which may not only save energy, but also avoid excessive sound pollution to an environment.

In one embodiment, the speaker 15 is a directional speaker. The media playing device according to this embodiment may directionally play relevant sounds to only those who may be interested in screens played by the media playing device, thereby avoiding sound interference to other persons. In one embodiment, the controller controls the speaker 15 to play no sound until the speaker 15 is controlled to turn to face the head of the user 31, and then the controller controls the speaker 15 to play sounds. The media playing device according to this embodiment may play related sounds only when a person is interested in a screen played thereon, which avoids sound pollution to an environment caused by the speaker playing sounds all the time.

In some embodiments, the camera 13 of the media playing device may be used to assist the controller to adjust an orientation of the speaker 15. For example, the camera 13 may be provided at a specific position relative to the speaker 15, and relative positions/relative orientations (referred to as "relative positions" collectively for simplicity) between the camera 13 and the speaker 15 may be known to the controller. The controller may calculate a rotation angle and/or a movement distance of the speaker 15 according to an image captured by the camera 13 to adjust an orientation of the speaker 15, so that the speaker 15 turns and faces the head of the user 31. In these embodiments, an orientation of the camera 13 may be fixed or variable. In some examples, the camera 13 may be a wide-angle camera (including a normal wide-angle camera and an ultra-wide-angle camera) to ensure that its field of view is large enough to capture the head of a person staying at a specific position with respect to the body 11 even without adjusting an orientation of the camera 13. In these examples, the orientation of the camera 13 may be fixed. In other examples, the orientation of the camera 13 may be variable. The controller may adjust the orientation (rotation and/or movement) of the camera 13 according to an image captured by the camera 13, so that an image of the head of the user 31 is located in the middle of the image captured by the camera 13. At the same time, since an initial position of the camera 13 and an initial position of the speaker 15 (the initial position refers to an orientation and a position of the camera 13/speaker 15 before rotation and movement) are known, the controller may control the orientation (rotation and/or movement) of the speaker 15 according to a rotation angle and/or a movement distance of the camera 13 and the relative positions between the camera 13 and the speaker 15 (referring to the relative relationship between the initial positions thereof), so that the speaker 15 turns and faces the head of the user 31.

In a case where an orientation of the camera 13 is variable, the relative positions between the camera 13 and the speaker 15 may be kept constant, that is, an orientation of the camera 13 and an orientation of the speaker 15 are adjusted synchronously. In these cases, the camera 13 and the speaker 15 may be arranged adjacent to each other, and the camera 13 may be used as an "eye" of the speaker 15, as described below with reference to FIG. 12 to FIG. 14. In addition, especially when the camera 13 is provided on the body 11 and the speaker 15 is provided far away from the body 11, the controller may further use additional information provided by other devices besides the camera 13, such as a distance sensor. Distance information of the user 31 provided by the distance sensor is additionally used by the controller to adjust an orientation of the speaker 15. When the sensor 14 is a distance sensor, information provided by the sensor 14 may be a distance between the user 31 and the body 11, and this information is useful when the controller controls to adjust an orientation of the speaker 15.

In some embodiments, the camera 13 of the media playing device may be used to receive operations of the user 31 on the media playing device, that is, the camera may be used as an interaction device of the media playing device. In these embodiments, similar to the above-mentioned embodiments, an orientation of the camera 13 may be fixed or variable. In some examples, the camera 13 may be a wide-angle camera to ensure that its field of view is large enough to capture the upper body of the user 31, including the head and chest, so as to receive an operation of the user 31 even without adjusting its orientation. In these examples, an orientation of the camera 13 may be fixed. In other examples, an orientation of the camera 13 may be variable. The controller adjusts an orientation of the camera 13 according to an image captured by the camera 13 so that an image of the head of the user 31 is located in the middle of the image captured by the camera 13, so as to receive an operation on the media playing device from the user 31 through the camera 13. In some examples, an operation of the user 31 may include gestures, such as sliding up, sliding down, sliding left, sliding right, etc. Alternatively, an operation of the user 31 may also include clicking a specific position on a screen displayed on the display 12, for example, the user 31 may raise his/her left hand which means clicking a "Cancel" button on the left side of the screen, and may raise his/her right hand which means clicking a "Confirm" button on the right side of the screen. The media playing device may display a prompt for an operation of the user 31 on the screen displayed on the display 12, for example, the user 31 may be instructed to slide left to switch the screen to the next advertisement. It is also possible to set a prompt at other locations that the user 31 may easily see, for example, a location on the transparent partition 21. The controller controls contents displayed on the display 12 and contents played by the speaker 15 according to an operation received by the camera 13.

It should be noted that in some of the embodiments, the camera 13 may be used both for assisting the controller to adjust an orientation of the speaker 15, and for receiving an operation by the user 31 on the media playing device. That is, a camera for assisting the controller to adjust an orientation of the speaker 15 and a camera for receiving an operation by the user 31 on the media playing device may be the same camera. In some embodiments, a camera for assisting the controller to adjust an orientation of the speaker 15 and a camera for receiving an operation by the user 31 on the media playing device may be different cameras.

In above embodiments, the interaction device for receiving an operation of the user 31 on the media playing device is implemented as a camera. It should be noted that in other embodiments, the interaction device may be implemented as one or more selected from a camera, a microphone, a distance sensor, a button, a touch panel, and a touch screen, as long as it can receive an operation by the user 31 on the media playing device. For example, when the interaction device is implemented as a microphone, an operation of the user 31 may include voice. The controller may respond to the operation of the user 31 according to a result of voice recognition on the voice from the user, that is, the controller may control contents displayed on the display 12 and contents played by the speaker 15 according to the user's operation. For another example, the interaction device may be implemented as a distance sensor, which replaces physical buttons or buttons displayed on the screen, thereby allowing the user 31 to perform non-contact operations. For still another example, when there is no transparent partition 21 between the media playing device and the user, a touch screen of the display 12 may serve as an interaction device. In addition, the body 11 may also be provided with interaction devices such as physical buttons and touch panels for interaction.

Figure 2:
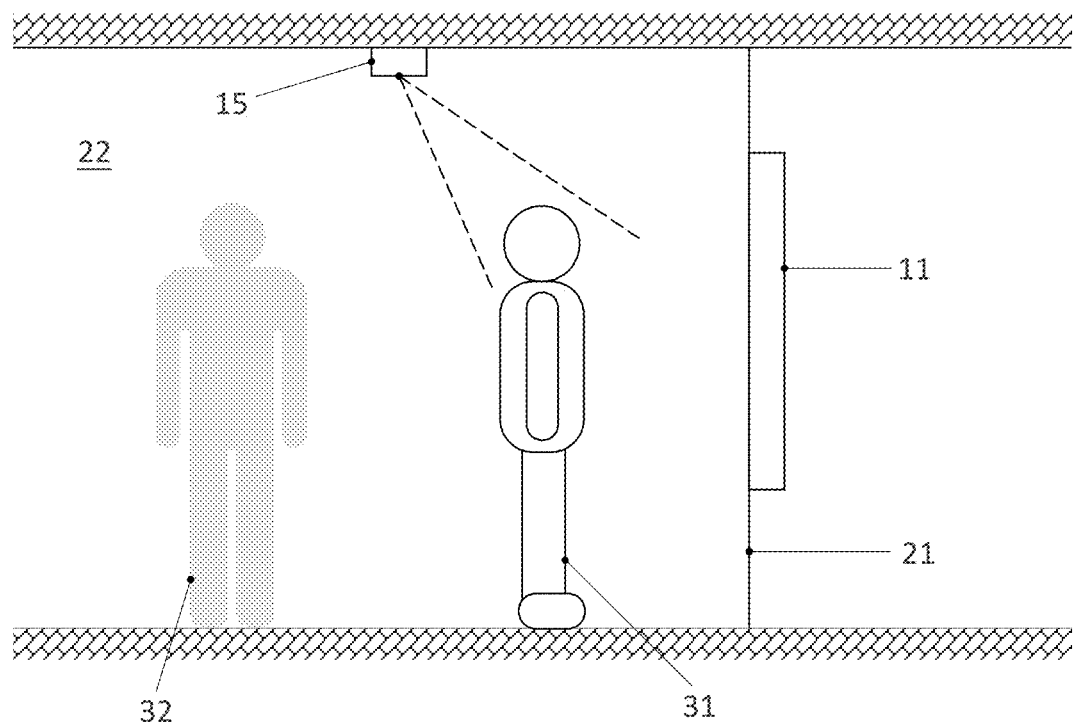
FIG. 2 is a schematic diagram of an operating state of a media playing device according to an embodiment of the present disclosure.
Figure 3:
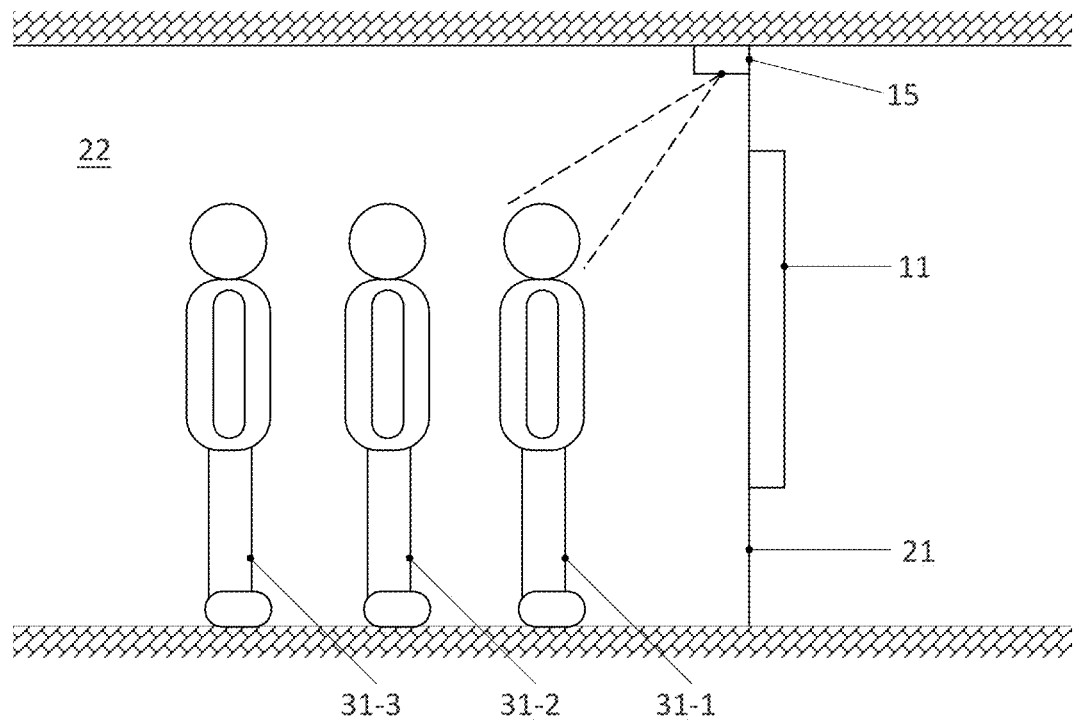
FIG. 3 is a schematic diagram of another operating state of the media playing device shown in FIG. 2.
Figure 4:
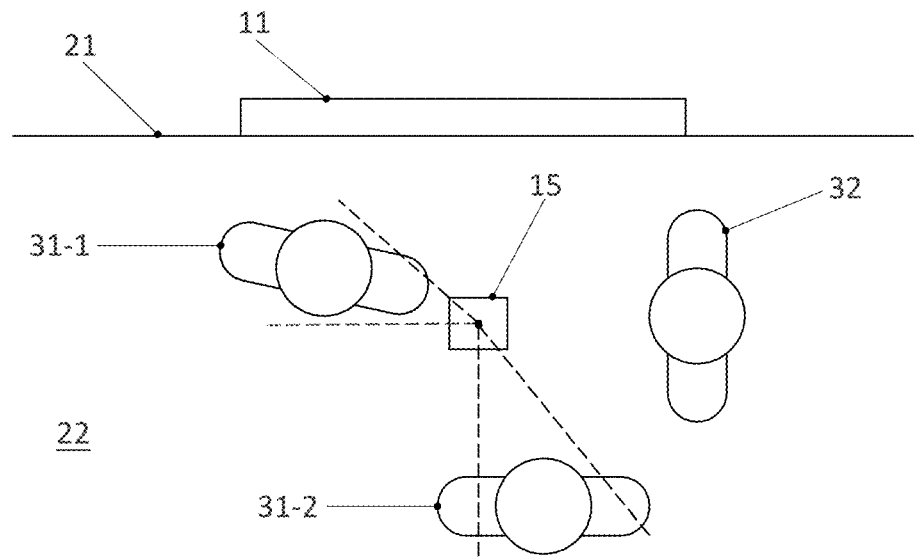
FIG. 4 is a schematic diagram of still another operating state of the media playing device shown in FIG. 2.

Traditional merchandise display is carried out by placing merchandise in shop windows or placing models wearing merchandise. It is also possible to display products by providing an advertisement player in the shop window to play advertisements in the form of videos or pictures. FIG. 2 through FIG. 4. are schematic diagrams of operating states of the media playing device of the embodiment. In these embodiments, the media playing device may be an advertisement player. The body 11 of the media playing device is mounted on the inside of the transparent partition 21 (shop window glass in these embodiments) while facing outward (e.g., a screen of the display 12 is oriented outward), and the speaker 15 is mounted on the outside of the transparent partition 21. In embodiments shown in FIG. 2 and FIG. 4, the speaker 15 is mounted at a position, far away from the transparent partition 21, of a ceiling of a hallway 22 outside the shop window. In the embodiment shown in FIG. 3, the speaker 15 is mounted at a position, close to the transparent partition 21, of the ceiling of the hallway 22 outside the shop window. It should be noted that in other embodiments, if the transparent partition 21 is provided with holes for sound transmission, the speaker 15 may be mounted on the inside of the transparent partition 21, so that sounds played by the speaker 15 may travel to the hallway 22 outside of the transparent partition 21 via the holes.

In embodiments shown in FIG. 2 and FIG. 4, there are usually persons 31 and 32 walking on the hallway 22 outside the shop window. A person 31 may be attracted by an advertisement screen being displayed by the media playing device and slow down or stop. The person 31 may be detected by a sensor as a person staying at a specific position relative to the body 11. A person 32 may not notice the advertisement screen being displayed by the media playing device, and pass the media playing device at a faster speed, then the person 32 may not be detected by a sensor as a person staying at a specific position relative to the body 11. In response to the sensor detecting the person 31 (also referred to as the user 31), the controller controls the speaker 15 to turn and face the head of the user 31, and controls the speaker 15 to play sounds associated with a screen being displayed by the media playing device, such as audio of an advertisement being displayed. In embodiments shown in FIG. 3 and FIG. 4, there may be multiple persons 31-1, 31-2, 31-3 on the hallway 22 outside the shop window who are interested in the advertisement screen being displayed by the media playing device at the same time. The persons 31-1, 31-2, 31-3 are usually located in different positions. In the embodiment shown in FIG. 3, the speaker 15 may include only one speaker. The controller may control the speaker to turn and face the head of one user 31. In one example, the controller controls the speaker to turn and face to the head of the user 31-1 closest to the media playing device to play sounds. In one example, the controller controls the speaker to turn and face to the heads of the users 31-1, 31-2, 31-3 who are interested in the advertisement screen being displayed by the media playing device in turn and play sounds. In the embodiment shown in FIG. 4, the speaker 15 may include more than one speaker. The controller may control multiple speakers to turn and face the heads of multiple users 31-1 and 31-2 respectively and play sounds.

Figure 5:
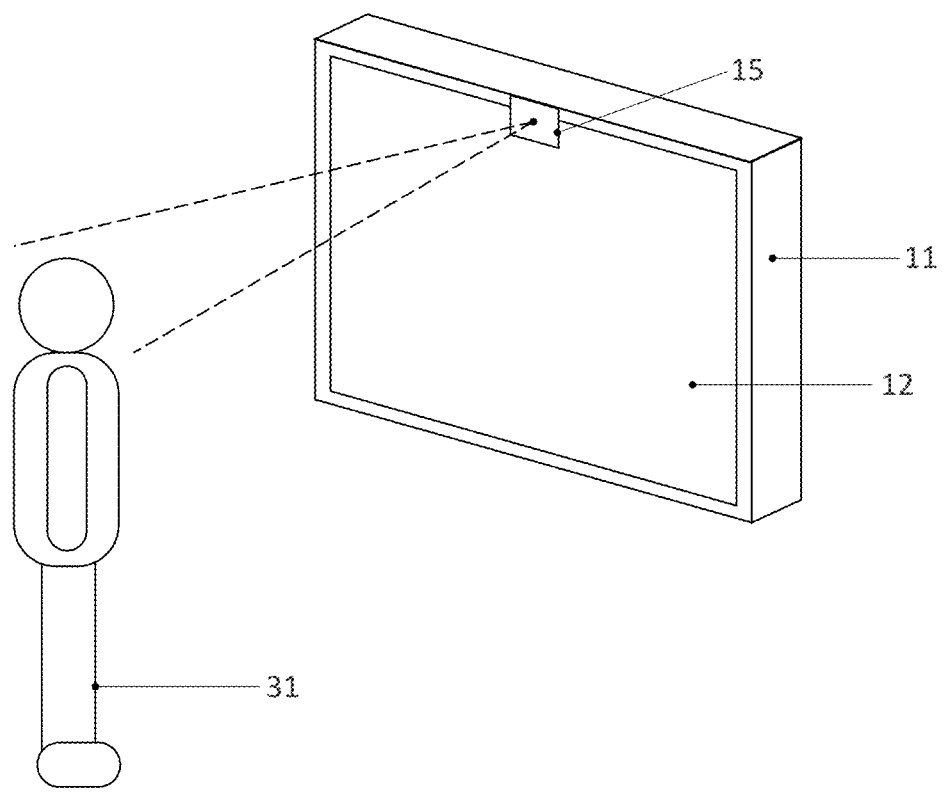
FIG. 5 is a schematic diagram of an operating state of the media playing device according to an embodiment of the present disclosure.

When the media playing device is placed in a relatively open indoor environment, such as in buildings such as houses, transportation, facilities such as rain shelters/sunshades, elevators or elevator halls, etc., where no partition is provided to separate the user 31 from the media playing device, the speaker 15 may be mounted without being separated from the body 11. FIG. 5 is a schematic diagram of one operating state of the media playing device according to an embodiment of the present disclosure. As shown in FIG. 5, the speaker 15 may be provided, along with the display 12, on the body 11 of the media playing device 11. Although not shown in FIG. 5, it should be noted that the media playing device may include a camera provided close to the speaker 15 for assisting the controller to adjust an orientation of the speaker 15, so that the speaker turns and faces the head of the user 31.

Figure 6:
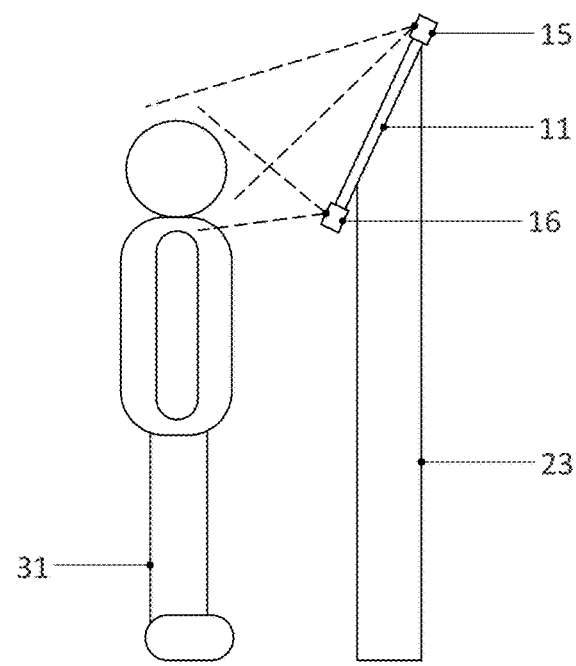
FIG. 6 is a schematic diagram of an operating state of a self-service terminal according to an embodiment of the present disclosure.
Figure 7:
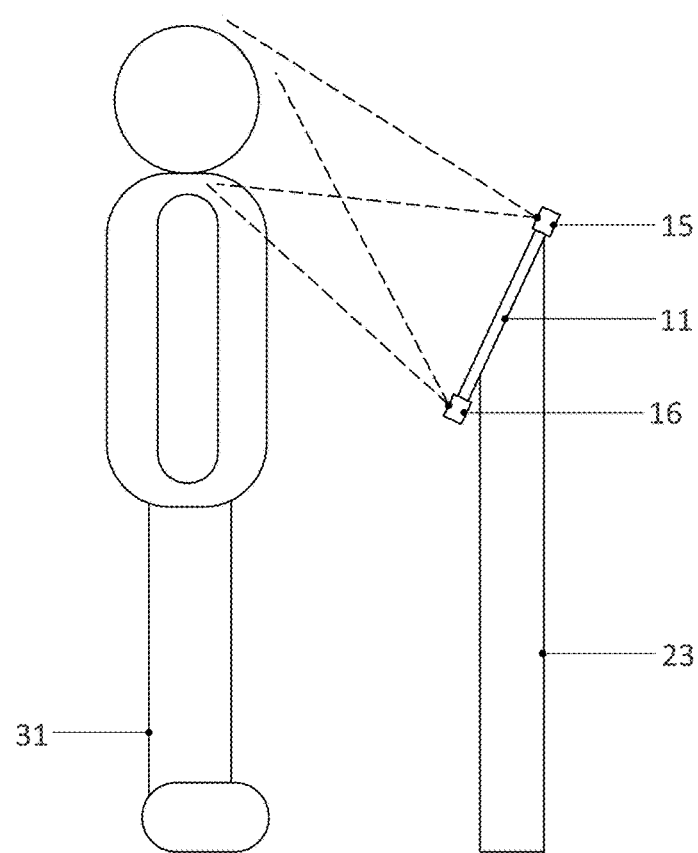
FIG. 7 is a schematic diagram of another operating state of the self-service terminal shown in FIG. 6.

FIG. 6 and FIG. 7 show operating states of a self-service terminal according to an embodiment of the present disclosure. The self-service terminal according to the present disclosure includes the body 11, and the speaker 15 and a microphone 16 provided on the body 11. The body 11 may be provided on a support 23. Although not shown in drawings, it should be noted that the body 11 may also be provided with the display, the camera and the sensor described above, and the body 11 may be arranged with one or more controllers therein. If the sensor or the camera detects that a user 31 stays at a specific position with respect to the body 11, the controller may adjust an orientation of the microphone 16 according to an image captured by the camera, so that the microphone 16 turns and faces the user's head. Specifically, the microphone 16 may be controlled to turn and face the mouth of the user. Further, as described above, the controller may adjust an orientation of the speaker 15 according to the image captured by the camera, so that the speaker 15 turns and faces the user's head. The self-service terminal may play sounds to the user 31 by the speaker 15, collect sounds (e.g., voice) from the user 31 by the microphone 16, and display a screen to the user 31 by the display. The microphone 16 may serve as an interaction device of the self-service terminal, and the controller may control contents displayed by the display and/or contents played by the speaker 15 according to sounds received by the microphone 16.

As shown in FIG. 6 and FIG. 7, the speaker 15 and the microphone 16 of the self-service terminal may adjust their orientations adaptively according to users 31 of different heights, so that the user 31 feels good for sounds played by the self-service terminal and the user 31's voice may be collected well. In this way, the self-service terminal may play sounds in a small volume, and the user may interact with the self-service terminal in a small volume, which is beneficial for the protection of user privacy. For example, the self-service terminal may be an automatic medicine vending machine, and the user 31 may describe symptoms through voice, and the self-service terminal recommends medicines available for the user 31 based on the voice collected by the microphone 16 (for example, through techniques such as semantic analysis). In this case, the user 31 may not want his voice to be heard by other persons during interaction with the self-service terminal. Therefore, it is beneficial to control the microphone 16 to turn and face the user's head or mouth so that the user 31 may speak in a small volume.

It should be noted that in embodiments shown in FIG. 6 and FIG. 7, if the self-service terminal is not required to play sounds, the speaker 15 may be omitted; and if the self-service terminal is not required to display a screen, the display may be omitted.

Figure 8:
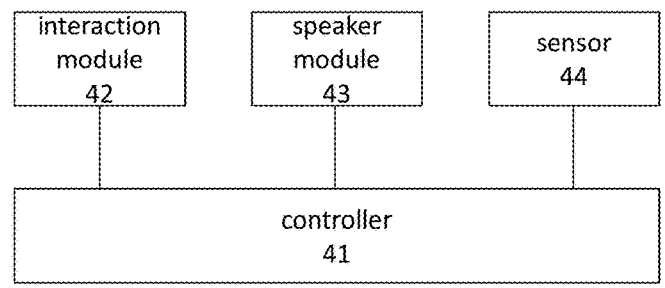
FIG. 8 is a schematic structural block diagram of a media playing device according to an embodiment of the present disclosure.
Figure 9:
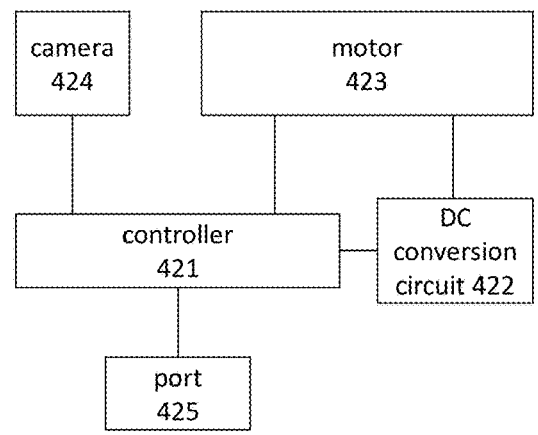
FIG. 9 is a schematic structural block diagram of an interaction module in the media playing device shown in FIG. 8.
Figure 10:
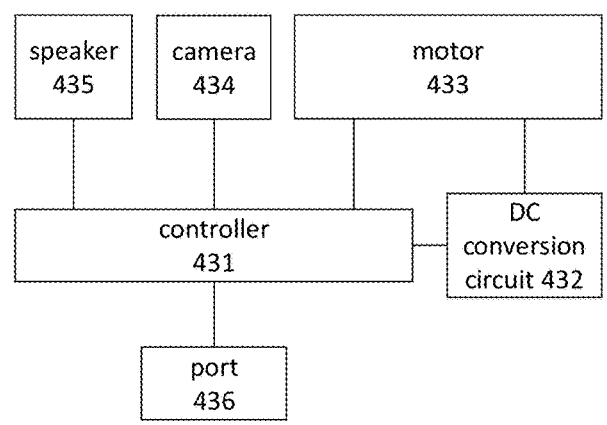
FIG. 10 is a schematic structural block diagram of a speaker module in the media playing device shown in FIG. 8.

FIG. 8 to FIG. 10 are schematic structural block diagrams of a media playing device 40 according to an embodiment of the present disclosure. As shown in FIG. 8, the media playing device 40 includes a controller 41, an interaction module 42 communicatively connected with the controller 41, a speaker module 43, and a sensor 44. The controller 41 may be implemented as one or more processors. The one or more processors may be any conventional processors, such as a central processing unit (CPU), a graphics processing unit (GPU), a microcontroller (MCU), etc., which are commercially available. Alternatively, the one or more processors may also be dedicated components, such as application specific integrated circuits (ASICs) or other hardware-based processors. Although not required, the one or more processors may include specialized hardware components to perform specific calculation processes faster or more efficiently, such as the analysis and process on images captured by a camera, the analysis and process on voices collected by a microphone, etc. The sensor 44 may be a distance sensor (including one or more selected from an optical distance sensor, an infrared distance sensor, and an ultrasonic distance sensor), and may be used to detect whether a person stays at a specific position relative to the body of the media playing device 40. Although not shown in FIG. 8, it should be noted that the media playing device 40 may also include an AC/DC conversion circuit for receiving alternating current (such as commercial power) from the outside of the media playing device 40 and converting the alternating current into direct current to be provided to various modules such as the controller 41, the interaction module 42, the speaker module 43, and the sensor 44.

A structure of the interaction module 42 is shown in FIG. 9. The interaction module 42 includes a controller 421, a camera 424, a motor 423, and a port 425 that are communicatively connected with the controller 421. The controller 421 is communicatively connected to the controller 41 through the port 425. It should be noted that in other embodiments, the controller 41 and the controller 421 may be the same physical device, for example, the same processor, in this case the port 425 may be omitted. The interaction module 42 may further include a DC conversion circuit 422 for converting a received voltage into a voltage adapted to a corresponding device, so as to supply power to the controller 421 and the motor 423. Although not shown in FIG. 9, it should be noted that the DC conversion circuit 422 may further supply power to the camera 424. The controller 421 adjusts an orientation of the camera 424 according to an image captured by the camera 424 so that an image of the user's head is located in the middle of the image captured by the camera 424, so as to receive the user's operation on the media playing device 40 through the camera 424. In some examples, an operation of the user may include gestures, such as sliding up, sliding down, sliding left, sliding right, etc. Alternatively, an operation of the user may also include clicking a specific position on the media playing device 40, for example, the user may raise his/her left hand which means clicking a "Cancel" button on the left side of the screen, and may raise his/her right hand which means clicking a "Confirm" button on the right side of the screen. The motor 423 may be used to drive the camera 424 to rotate and/or move, thereby changing an orientation of the camera 424. The controller 421 may calculate a rotation angle and/or a movement distance of the camera 424 according to an image captured by the camera 424, and then may adjust an orientation of the camera 424 by controlling the motor 423 to rotate by a certain number of rotating turns in a rotating direction.

A structure of the speaker module 43 is shown in FIG. 10. The speaker module 43 includes a controller 431, a speaker 435, a camera 434, a motor 433, and a port 436 that are communicatively connected with the controller 431. The controller 431 is communicatively connected to the controller 41 through the port 436. It should be noted that, in other embodiments, the controller 41 and the controller 431 may be the same physical device, for example, the same processor, in this case the port 436 may be omitted. The speaker module 43 may further include a DC conversion circuit 432 for converting a received voltage into a voltage adapted to a corresponding device, so as to supply power to the controller 431 and the motor 433. Although not shown in FIG. 10, it should be noted that the DC conversion circuit 432 may further supply power to the speaker 435 and the camera 434. The speaker 435 and the camera 434 may be installed to be adjacent to each other and move in synchronization. The controller 431 adjusts an orientation of the speaker 435 according to an image captured by the camera 434, so as to control the speaker 435 to turn and face the user's head. The motor 433 may be used to drive the speaker 435 and the camera 434 to rotate and/or move, thereby changing orientations of the speaker 435 and the camera 434. The controller 431 may calculate rotation angles and/or movement distances of the speaker 435 and the camera 434 according to an image captured by the camera 434, and then may adjust orientations of the speaker 435 and the camera 434 by controlling the motor 433 to rotate by a certain number of rotating turns in a rotating direction.

The interaction device described in above embodiments (e.g., the camera 13 in some embodiments), may be implemented as the above-described interaction module 42. When the interaction device is a microphone, a distance sensor, etc., it is only necessary to replace the camera 424 in the aforementioned interaction module 42 with the microphone, the distance sensor, etc. The speaker 15 described in the above embodiments may be implemented as the above speaker module 43.

Figure 11:
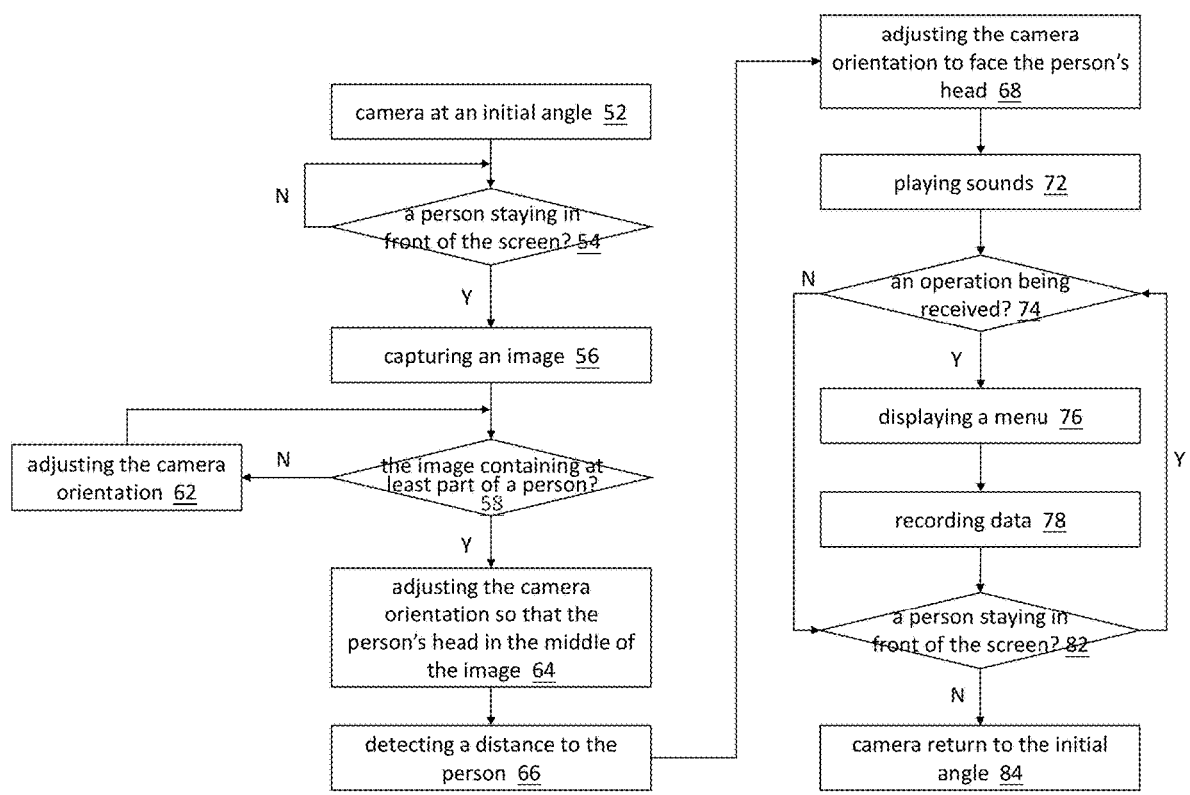
FIG. 11 is a schematic flowchart of an operation method of a media playing device according to an embodiment of the present disclosure.

FIG. 11 is a schematic flowchart of an operating method of a media playing device according to an embodiment of the present disclosure. The schematic operating method of the media playing device is described below with reference to FIG. 11 by taking the media playing device shown in FIG. 1 as an example. When the media playing device is idle, the controller controls an orientation of the camera 13 to be at an initial angle (operation 52). The sensor detects in real time whether a person stays in front of the screen of the display 12 (operation 54). If a determination result of the operation 54 is no, the detection by the sensor is continued. If a determination result of operation 54 is yes, an image is captured by the camera 13 and is analyzed and processed by means of computer vision technology (operation 56). It should be noted that the camera 13 may capture images all the time, instead of starting capturing after it is detected that a person stays in front of the screen of the display 12. According to a result of the analysis and process on the captured image, it is determined whether the image contains at least part of a person (operation 58).

The at least part of a person may be, for example, all or part of the top of the head, ears, shoulders, arms, torso, legs, and the like. If a determination result of the operation 58 is no, an orientation of the camera 13 is adjusted so that the camera 13 may capture at least part of the person (operation 62). The adjustment of the orientation of the camera 13 in the operation 62 may be, for example, a scanning operation of the camera 13 within its maximum adjustable angle range, so as to capture at least part of the person. If a result of the operation 58 is yes, an orientation of the camera 13 is adjusted so that an image of the person's head is located in the middle of the image captured by the camera (operation 64). The adjustment of the orientation of the camera 13 in the operation 64 may be, for example, an adjustment operation performed according to a positional relationship between at least part of the person already captured by the camera 13 and the person's head. For example, if the person's shoulders instead of the person's head appear in the image captured by the camera 13, that is, the camera 13 has captured the person's shoulders, then an orientation of the camera 13 is adjusted to deflect upwards, so that the person's head appears in the captured image and is located in the middle of the image. For another example, if the person's ears instead of the person's head appear in the image captured by the camera 13, then an orientation of the camera 13 is adjusted left or right to deflect toward the middle of the person, so that the person's head appears in the image and an image of the person's head is located in the middle of the image.

A distance from the person to the body 11 of the media playing device is detected by the sensor 14 (operation 66). The controller adjusts an orientation of the speaker 15 according to the image captured by the camera 13 and the distance detected by the sensor 14 so that the speaker 15 turns and faces the person's head (operation 68), and controls the speaker 15 to play sounds (operation 72). The controller determines whether an operation from the user is received through the camera 13 (operation 74). If a determination result of the operation 74 is yes, the controller controls the display 12 to display an operation menu (operation 76) and save data (operation 78). Then the controller determines whether a person stays in front of the screen by the sensor 14 (operation 82). If the determination result of the operation 74 is that no operation from the user is received, the flow skips operations 76 and 78 and directly jumps to operation 82, that is, the controller determines whether a person stays in front of the screen. If a determination result of the operation 82 is yes, then the operation 74 is performed to determine whether an operation from the user is received through the camera 13. If a determination result of the operation 82 is no, the controller adjusts an orientation of the camera 13 (or orientations of the camera 13 and the speaker 15) back to an initial orientation (operation 84).

In the above operation 78, saving (also referred to as "recording") data by the controller refers to saving data collected by the media playing device. These data may be used for big data analysis. These data may be, for example, features of a person staying in front of the media playing device (for example, the gender, age, and clothing of the person acquired by analyzing images captured by the camera 13); the length of time and the start/end time of the person watching or listening to the media playing device; whether the staying person has operated the media playing device; and operations by the user on the media playing device and the time of the operation, etc. The operations refer to the above-described operations performed through the interaction device, and include but are not limited to gesture operations, operations on the touch screen, interaction through microphones, and the like. When the media playing device is an advertisement player installed in a shop window, facial features of a person stayed in front of the media playing device may be recorded by using an image captured by the camera 13 and may be compared with facial features of customers in images captured by a camera in the shop, so as to analyze whether the person stayed in front of the media playing device enters the shop, for example, to determine whether the advertisement is effective. The saved start/end time data may be used to associate the user with the screen/sound played by the media playing device, so as to analyze what playing contents specific persons are interested in. The start/end time data may also be used to analyze when are more people interested in contents played by the media playing device, etc.

Although not shown in drawings, the present disclosure further provides a media playing device that only plays a single medium, such as sounds. The media playing device includes a body, a speaker, and a controller. In response to a user staying at a specific position relative to the body, the controller controls the speaker to turn and face the user's head, and controls the speaker to play sounds. In some cases, the controller controls the speaker to play sounds in response to the speaker facing the user's head. In some cases, the controller controls the speaker to play no sound until the speaker is controlled to play sounds.

Figure 12:
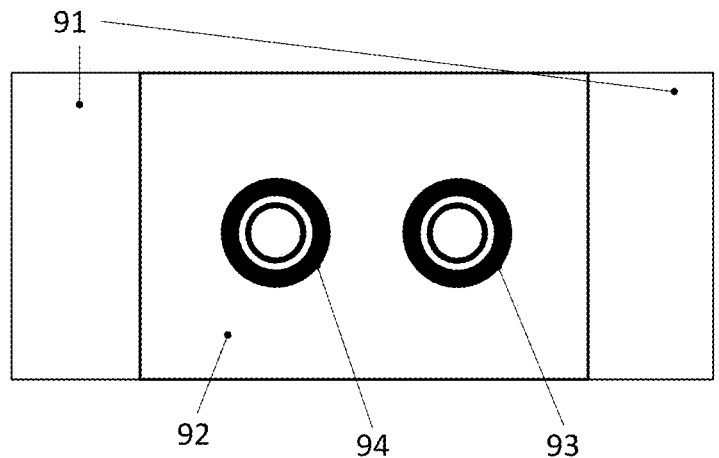
FIG. 12 is a schematic front view of a motion component in a media playing device according to an embodiment of the present disclosure.
Figure 13:
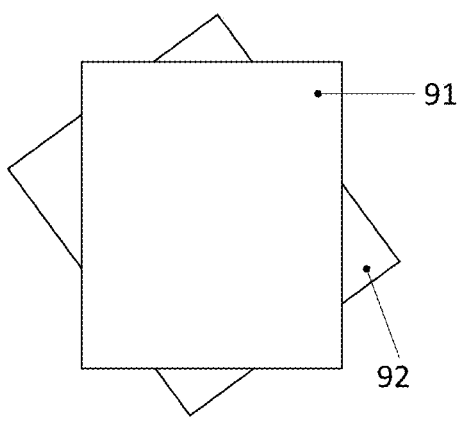
FIG. 13 is a schematic right view of the motion component shown in FIG. 12.
Figure 14:
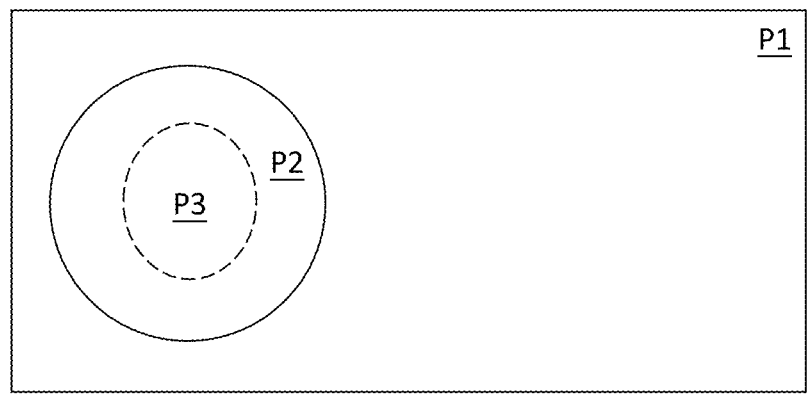
FIG. 14 is a schematic explanatory diagram of an orientation adjustment of the motion component shown in FIG. 12.
Figure 14:
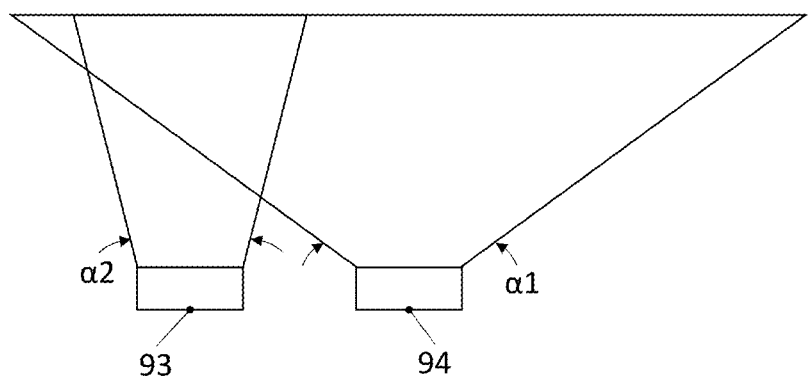

FIG. 12 and FIG. 13 are schematic structural diagrams of a motion component 90 in the media playing device according to an embodiment of the present disclosure. FIG. 14 is a schematic explanatory diagram for an orientation adjustment of the motion component 90. Any one of the speaker 15, the microphone 16, and the speaker module 43 in the above embodiments may be implemented as the motion component 90.

The motion component 90 includes a base 91 and a motion part 92 rotatable relative to the base 91. FIG. 12 is a schematic front view of the motion component 90 when the motion part 92 is in an initial position, and FIG. 13 is a schematic right view of the motion component 90 when the motion part 92 is not in the initial position, that is, when the motion part 92 is rotated downward by a certain angle relative to the orientation of the initial position. In this embodiment, the motion part 92 only rotates relative to the base 91 in the longitudinal direction of the motion component 90, that is, rotates upward or downward. It should be noted that, in another embodiment, the motion part 92 may also be rotated relative to the base 91 in the lateral direction of the motion component 90, that is, rotated leftward or rightward. In yet another embodiment, the motion part 92 may be moved relative to the base 91 along the longitudinal and/or lateral directions of the motion component 90. In yet another embodiment, the motion part 92 may be rotated and moved relative to the base 91 along the longitudinal and/or lateral directions of the motion component 90. The motion component 90 further includes a device 93 and a camera 94 which are arranged on the motion part 92 and are adjacent to each other. The camera 94 may be a visible light camera or an infrared camera or the like. The device 93 may be a speaker, or an interaction device such as a microphone.

In the embodiment shown in FIG. 12, the device 93 and the camera 94 are positioned at the same longitudinal position but different lateral positions. FIG. 14 shows the lateral field of view P1 and the field angle $\alpha 1$ of the camera 94, and the operating range P2 and the operating range angle $\alpha 2$ of the device 93. For example, when the device 93 is a directional speaker, its operating range is an audible range, and its operating range angle $\alpha 2$ may be 30 degrees. In a case where the device 93 and the camera 94 are adjacent to each other, as shown in FIG. 14, the field of view P1 of the camera 94 having a wider field angle $\alpha 1$ may contain the operating range P2 of the device 93 having a narrower operating range angle $\alpha 2$. In this embodiment, a target of an adjustment of the motion component 90 may be to adjust an image of the person's head to the middle part of the operating range P2 of the device 93. The device 93 and the camera 94 are collectively arranged on the motion part 92. As the motion part 92 rotates and/or moves relative to the base 91, orientations and/or positions of the device 93 and the camera 94 also change accordingly, and positions of the field of view P1 and the operating range P2 also change accordingly, while a positional relationship between the field of view P1 and the operating range P2 remains unchanged.

It should be noted that the motion component 90 may also include a device that drives the motion part 92 to move (rotate and/or move), such as a motor. The motor rotates to drive the motion part 92 to rotate by a specific angle and/or move by a specific distance, thereby driving the device 93 to change its orientation and/or position. The rotation of the motor may further bring the motion part 92 to return to its initial position, thereby bringing the device 93 and the camera 94 to return to their initial positions. In one embodiment, the motion component 90 further includes a position switch that matches the initial position of the motion part 92. In the process of returning to the initial position, if the position switch is triggered, the motor stops rotating.

Figure 15:
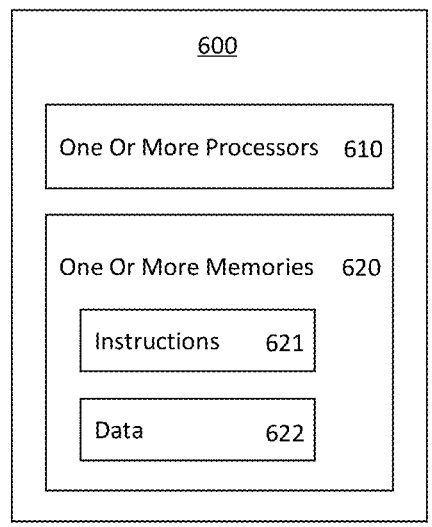
FIG. 15 is a schematic structural block diagram of a media playing device according to an embodiment of the present disclosure.

FIG. 15 is a schematic structural block diagram of a media playing device 600 (or a self-service terminal 600) according to an embodiment of the present disclosure. Various functions described above (including the above-mentioned methods, operations, procedures, steps, applications, programs, etc.) may all be implemented in hardware, software, firmware, or any combination thereof. If it is implemented in software, various functions may be implemented by one or more instructions 621 stored in a memory 620, such as a computer-readable medium. If it is implemented in firmware, various functions may be implemented by a processor 610 executing instructions 621 (such as firmware codes) stored in the memory 620. If it is implemented in hardware, various functions may be implemented by processing circuits.

At least a part of the media playing device 600, such as the controller in each of the foregoing embodiments, may include one or more processors 610 and one or more memories 620, wherein the one or more processors 610 may be connected communicatively with the one or more memories 620. One or more memory in the one or more memories 620 may be connected to the one or more processors 610 via a bus, a port, or a network, and/or may be directly connected to or incorporated with any one of the one or more processors 610. Each of the one or more memories 620 may store contents accessible to the one or more processors 610, including instructions 621 which may be executed by the one or more processors 610, and data 622 which may be retrieved, manipulated or stored by the one or more processors 610.

The instructions 621 may be any instruction set to be directly executed by the one or more processors 610, such as machine code, or any instruction set to be executed indirectly, such as a script. The instructions 621 may be stored in an object code format for direct processing by the one or more processors 610, or stored in any other computer language, including scripts or collections of independent source code modules that are interpreted on demand or compiled in advance. The above description of functions of the media playing device 600 explains functions, methods, and routines of the instruction 621 in more detail.

The one or more memories 620 may be any temporary or non-transitory computer-readable storage media capable of storing contents accessible by the one or more processors 610, such as hard drives, memory cards, ROM, RAM, DVD, CD, USB memory, writable memory and read-only memory, etc. One or more of the one or more memories 620 may include a distributed storage system, where the instructions 621 and/or data 622 may be stored on multiple different storage devices that may be physically located at the same or different geographic locations.

The one or more processors 610 may retrieve, store, or modify the data 622 according to the instruction 621. The data 622 stored in the one or more memories 620 may include the above-mentioned image captured by the camera, the distance measured by the sensor, the screen and sound contents played by the media playing device 600, and the saved data, etc. Those skilled in the art should understand that other data may also be stored in the one or more memories 620. For example, although the subject described herein is not restricted by any specific data structure, the data 622 may also be stored in a computer register (not shown), or be stored in a relational database as a table or XML document with many different fields and records. The data 622 may be formatted in any format readable by a computing device, such as but not limited to binary values, ASCII, or Unicode. In addition, the data 622 may include any information sufficient to identify related information, such as numbers, descriptive text, proprietary codes, pointers, references to data stored in other storage such as other network locations, or information used by functions to calculate related data.

The one or more processors 610 may be any conventional processors, such as a central processing unit (CPU), a graphics processing unit (GPU), a microcontroller (MCU), etc., which are commercially available. Alternatively, the one or more processors 610 may also be dedicated components, such as an application specific integrated circuit (ASIC) or other hardware-based processors. Although not required, the one or more processors 610 may include dedicated hardware components to perform specific calculation processes faster or more efficiently, such as processing images captured by a camera, processing sounds collected by a microphone, and so on.

Although FIG. 15 schematically shows the one or more processors 610 and the one or more memory 620 in the same frame, the one or more processors 610 or the one or more memories 620 may actually include multiple processors or memories provided in the same physical housing or in different physical housings. For example, one of the one or more memories 620 may be a hard disk drive or other storage medium located in a housing different from a housing of each of the one or more processors 610. Therefore, references to processors or memories should be understood to include references to collections of processors or memories that may or may not operate in parallel. Although some of the functions described above are indicated as occurring on a single computing device with a single processor, various aspects of the subject matter described herein may be implemented by multiple processors 610 communicating with each other, for example, through a network.

Further, although FIG. 15 schematically show the one or more processors 610 and the one or more memories 620 in different blocks, at least a portion of the media playing device 600 may be formed as one component. For example, the processor 610, the memory 620, and various peripheral interfaces (such as a USB interface, an A/D conversion interface, and a UART interface, etc.) may be integrated on a single chip to form a single chip microcomputer.

Further, the embodiments of the present disclosure may also include the following examples:

1. A media playing device, comprising:
   a body;
   a speaker; and
   a controller configured to control the speaker to face the head of a user and control the speaker to play a sound in response to the user staying at a specific position relative to the body.
2. The media playing device according to 1, wherein the controller is further configured to control the speaker to play a sound in response to the speaker facing the head of the user.
3. The media playing device according to 1, wherein the speaker is configured to play no sound until the controller controls the speaker to play a sound.
4. The media playing device according to 1, further comprising:
   a first camera provided at a specific position relative to the speaker,
   wherein the controller is further configured to adjust an orientation of the speaker according to an image captured by the first camera, so as to control the speaker to face the head of the user.
5. The media playing device according to 1, further comprising:

a sensor configured to detect whether the user stays at a specific position relative to the body.

6. The media playing device according to 1, further comprising:

a display configured to display a screen, wherein the controller is further configured to control the speaker to play a sound associated with a screen being displayed on the display in response to the speaker facing the head of the user.

7. The media playing device according to 6, wherein the display is mounted on the body.

8. The media playing device according to 6, further comprising:

a second camera, wherein the controller is further configured to adjust an orientation of the second camera according to an image captured by the second camera, so that an image of the head of the user is located at a center of the image captured by the second camera, so as to receive an operation on the media playing device from the user through the second camera.

9. The media playing device according to 1, further comprising:

a microphone, wherein the controller is further configured to control the microphone to face the head of the user in response to a user staying at a specific position relative to the body.

10. The media playing device according to 1, wherein the controller is further configured to record data about one or more of: a feature and/or an image of the user; staying duration of the user and start/end time of the staying duration; whether there is an operation on the media playing device from the user, what the operation is and when the operation is received.

11. A media playing device, comprising:

a display;

a speaker; and a controller configured to:

control the display to display a screen;

in response to a user staying at a specific position relative to the display, control the speaker to face the head of the user; and in response to the speaker facing the head of the user, control the speaker to play a sound associated with a screen being displayed on the display.

12. The media playing device according to 11, wherein the speaker is a directional speaker.

13. The media playing device according to 11, further comprising:

a camera provided at a specific position relative to the speaker, wherein the controller is further configured to adjust an orientation of the speaker according to an image captured by the camera, so as to control the speaker to face the head of the user.

14. The media playing device according to 13, wherein an orientation of the speaker is adjustable in sync with an orientation of the camera, and the controller is further configured to adjust orientations of the camera and the speaker synchronously according to the image captured by the camera.

15. The media playing device according to 11, further comprising:

a sensor configured to detect whether the user stays at a specific position relative to the display.

16. The media playing device according to 11, further comprising:

an interaction device configured to receive an operation on the media playing device from the user, wherein the controller is further configured to control contents displayed on the display and contents played by the speaker according to the operation received by the interaction device.

17. The media playing device according to 16, wherein the interaction device comprises one or more of a camera, a microphone, a distance sensor, a button, a touch panel, and a touch screen.

18. The media playing device according to 11, wherein the display and the speaker are mounted to be separated from each other.

19. The media playing device according to 18, wherein the display is mounted on the inside of a transparent partition with facing outwardly, and the speaker is mounted on the outside of the transparent partition.

20. The media playing device according to 11, wherein the controller is further configured to record data about one or more of: a feature and/or an image of the user; staying duration of the user and start/end time of the staying duration; whether there is an operation on the media playing device from the user, what the operation is and when the operation is received.

21. A self-service terminal, comprising:

a display configured to display a screen;

a microphone;

a camera provided at a specific position relative to the microphone; and a controller configured to in response to a user staying at a specific position relative to the display, adjust an orientation of the microphone according to an image captured by the camera, so as to control the microphone to face the head of the user.

22. The self-service terminal according to 21, wherein the controller is further configured to control contents displayed on the display according to sounds received by the microphone.

23. The self-service terminal according to 21, wherein the controller is further configured to record data about one or more of: a feature and/or an image of the user; staying duration of the user and start/end time of the staying duration; whether there is an operation on the self-service terminal from the user, what the operation is when the operation is received; and whether there is interaction from the user with the self-service terminal through the microphone, what the interaction is and when the interaction is received.

Although some specific embodiments of the present disclosure have been described in detail through examples, those skilled in the art should understand that the above examples are only for illustration and not for limiting the scope of the present disclosure. The various embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the appended claims.

What is claimed is:

1. A media playing device, comprising:

a display;

a speaker;

a camera; and a controller communicatively coupled to the display, the speaker, and the camera, wherein the controller is configured to:

control a screen on the display;
in response to a user staying at a first position relative to the display, control the speaker to face a head of the user;
in response to the speaker facing the head of the user, cause the speaker to play a sound associated with the screen on the display;
wherein the camera is located at a second position relative to the speaker, adjust a first orientation of the speaker according to an image captured by the camera, where the speaker faces the head of the user; and
wherein the first orientation of the speaker is in sync with a second orientation of the camera, adjust the first and the second orientations synchronously according to the image captured by the camera.

2. The media playing device according to claim 1, wherein the speaker is a directional speaker.

3. The media playing device according to claim 1, further comprising:
a sensor communicatively coupled to the controller, configured to detect whether the user stays at the first position relative to the display.

4. The media playing device according to claim 1, further comprising:
an interaction device communicatively coupled to the controller, configured to receive an operation from the user,
wherein the controller is further configured to control first contents on the display and second contents played by the speaker according to the operation.

5. The media playing device according to claim 4, wherein the interaction device comprises one or more of the camera, a microphone, a distance sensor, a button, a touch panel, or a touch screen.

6. The media playing device according to claim 1, wherein the display is mounted separately from the speaker.

7. The media playing device according to claim 6, wherein the display is mounted on one side of a transparent partition facing outwardly, and the speaker is mounted on the other side of the transparent partition; or
the display and the speaker are both mounted on a same side of the transparent partition facing outwardly, wherein sounds from the speaker travel outside the transparent partition via holes in the transparent partition.

8. The media playing device according to claim 7, wherein the transparent partition comprises a panel of a light box or glass of a shop window.

9. The media playing device according to claim 7, wherein the controller is further configured to provide a prompt on the transparent partition for an operation of the user on the media playing device.

10. The media playing device according to claim 1, wherein the controller is further configured to record data about one or more of: a feature or an image of the user; a staying duration of the user; a start or end time of the staying duration; whether an operation on the media playing device is received from the user; the operation; and when the operation is received.

11. A method of a media playing device, comprising:
controlling a speaker to face a head of a user in response to the user staying at a first position relative to the media playing device;
causing the speaker to play a sound in response to the speaker facing the head of the user;
wherein a first camera is located at a second position relative to the speaker, adjusting a first orientation of the speaker according to an image captured by the first camera, where the speaker faces the head of the user;
adjusting a second orientation of a second camera according to a second image captured by the second camera, wherein the second image comprises the head of the user located at a center of the second image; and
receiving an operation on the media playing device from the user via a third image captured by the second camera.

12. The method according to claim 11, further comprising:
detecting whether the user stays at the first position relative to the media playing device.

13. The method according to claim 11, further comprising:
displaying a screen; and
playing a sound associated with the screen being displayed in response to the speaker facing the head of the user.

14. The method according to claim 11, further comprising:
controlling a microphone to face the head of the user in response to the user staying at the first position relative to a display of the media playing device.

15. A non-transitory computer readable medium storing instructions that, when executed by a processor of a media playing device, cause the media playing device to perform operations, the operations comprising:
controlling a screen on a display;
in response to a user staying at a first position relative to the display, controlling a speaker to face a head of the user;
in response to the speaker facing the head of the user, causing the speaker to play a sound associated with the screen on the display;
wherein a camera is located at a second position relative to the speaker, adjusting a first orientation of the speaker according to an image captured by the camera, where the speaker faces the head of the user; and
wherein the first orientation of the speaker is in sync with a second orientation of the camera, adjusting the first and the second orientations synchronously according to the image captured by the camera.

16. The non-transitory computer-readable medium according to claim 15, further comprising:
receiving an operation from the user; and
controlling first contents on the display and second contents played by the speaker according to the operation.

17. The non-transitory computer-readable medium according to claim 16, wherein the media playing device comprises one or more of the camera, a microphone, a distance sensor, a button, a touch panel, or a touch screen.

18. The non-transitory computer-readable medium according to claim 15, further comprising: controlling a microphone to face the head of the user in response to the user staying at the first position relative to the display.

19. The non-transitory computer-readable medium according to claim 15, further comprising recording data about one or more of: a feature or an image of the user; a staying duration of the user; a start or end time of the staying duration; whether an operation on the media playing device is received from the user; the operation; and when the operation is received.

20. The non-transitory computer-readable medium according to claim 18, wherein the operations further comprise controlling contents on the display according to sounds received by the microphone.

* * * * *